United States Patent [19]
Hobbs

[11] Patent Number: 5,275,064
[45] Date of Patent: Jan. 4, 1994

[54] EXTENSIBLE PLATFORM WITH CABLE DRIVE SYSTEM

[75] Inventor: James D. Hobbs, Plainfield, Ind.

[73] Assignee: General Devices Co., Inc., Indianapolis, Ind.

[21] Appl. No.: 897,882

[22] Filed: Jun. 12, 1992

[51] Int. Cl.⁵ .......................................... F16H 21/44
[52] U.S. Cl. .................... 74/110; 414/749; 312/331; 312/334.1; 384/18; 108/143; 108/20
[58] Field of Search ........... 74/110; 108/143, 20, 108/137; 414/749; 312/331, 334.1, 334.5, 332.1; 384/18, 19, 20

[56] References Cited

U.S. PATENT DOCUMENTS

| | | | |
|---|---|---|---|
| 3,396,601 | 2/1993 | Wright | 74/110 |
| 3,450,446 | 6/1969 | Fall et al. | 384/19 |
| 3,521,939 | 7/1970 | Fall et al. | 312/332.1 |
| 3,687,505 | 8/1972 | Fall et al. | 384/18 |
| 3,738,716 | 6/1973 | Lambert | 384/18 |
| 3,776,608 | 12/1973 | Fall et al. | 384/18 |

OTHER PUBLICATIONS

"Slides and Packaging Accessories", Jonathan Manufacturing Corporation, Fullerton, Calif., pp. 40–41, date unknown.

*Primary Examiner*—Leslie A. Braun
*Assistant Examiner*—William O. Trousdell
*Attorney, Agent, or Firm*—Barnes & Thornsburg

[57] ABSTRACT

A telescoping platform assembly able to convert each unit of distance moved by a driver into two, four, or greater number of units of platform extension includes five or more interconnected slide members. The interconnected slide members are extended by operation of a powered driver coupled to the second slide member cooperating with first, second, and third cable and pulley mechanisms. The first cable and pulley mechanism couples the first, second, and third slide members together so that the third slide extends twice as far as the second slide member. The second cable and pulley mechanism couples the second, third, and fourth slide members together so that the fourth slide members extends three times as far as the second slide member. The third cable and pulley mechanism couples the third, fourth, and fifth slide members together so that the fifth slide member extends four times as far as the second slide member. Thus, the first, second, and third coupling mechanisms cooperate to extend the platform four times the total extension of the second slide member. Fourth, fifth, and sixth cable and pulley mechanisms are similarly coupled to the slide members to retract the telescoping platform assembly from the extended position.

29 Claims, 5 Drawing Sheets

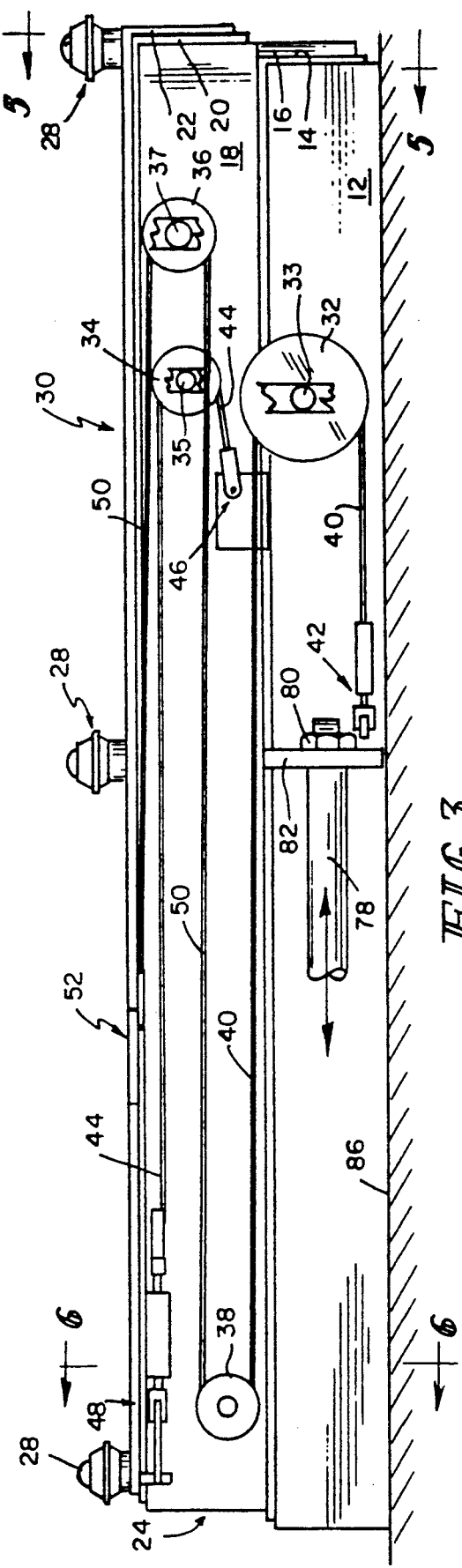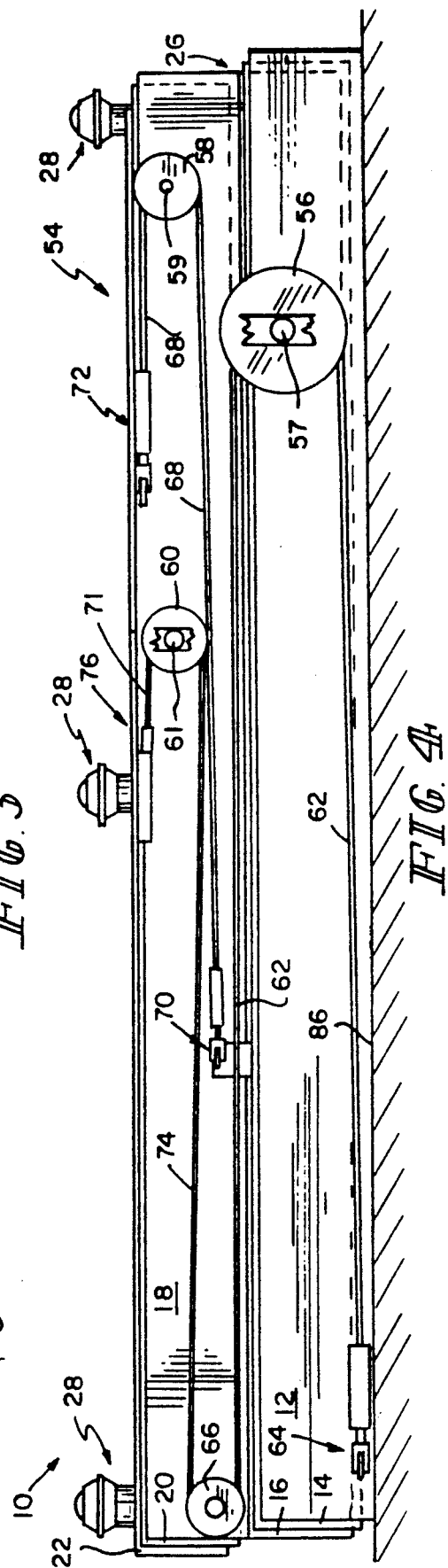

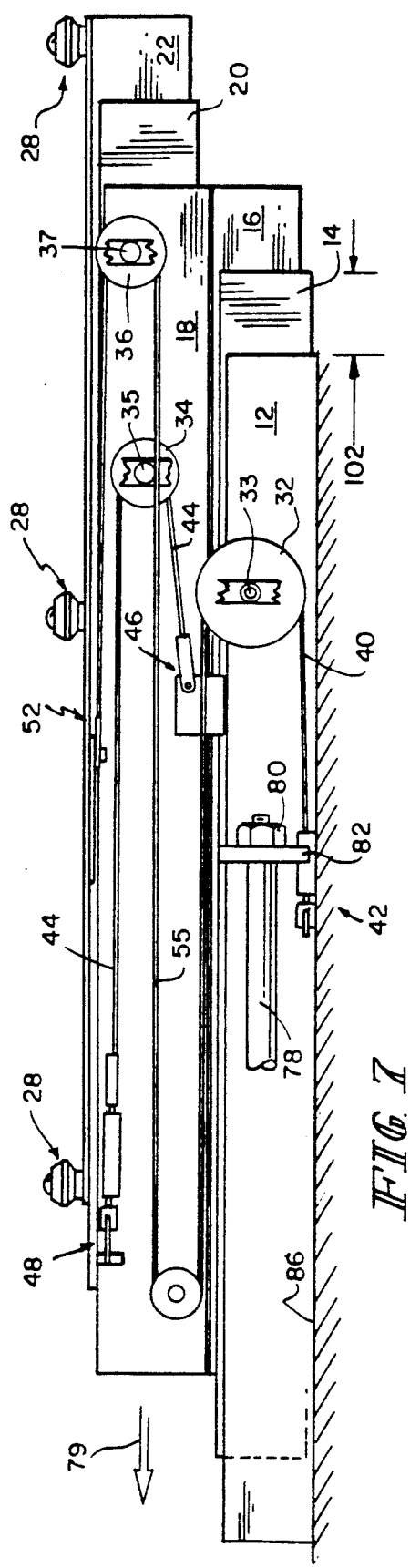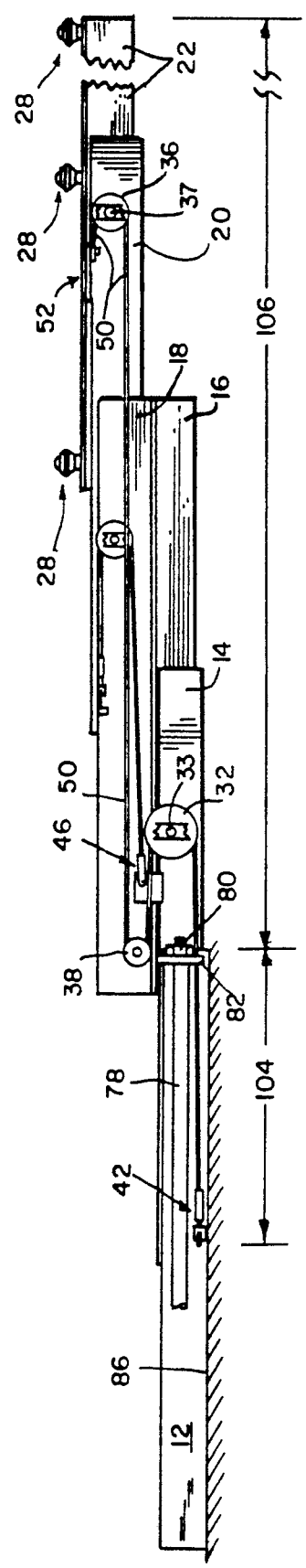

EXTENSIBLE PLATFORM WITH CABLE DRIVE SYSTEM

BACKGROUND AND SUMMARY OF THE INVENTION

The present invention relates to telescoping platform assemblies configured to support a movable platform, and particularly to modular telescoping platform assemblies comprising two or more telescoping slide assembly modules attached to each other. More particularly, the present invention relates to modular telescoping platform assemblies having automatic extension and retraction capability to multiply the effective reach of a driving mechanism.

Telescoping slide assemblies generally comprise two or more interconnected slide members that are free to travel in a back and forth motion relative to each other. Typical uses for such slide assemblies include support for file drawers and equipment racks for inward and outward movement of the drawer or rack relative to a frame. Some slide assemblies incorporate pulley and cable systems to promote synchronized extension of the telescoping slide assemblies. See, for example, U.S. Pat. No. 3,687,505 to Fall et al.

Typically, the slide assemblies are manually operated. However, in those situations where heavy equipment is to be extended or retracted, a powered driver would be necessary. Mechanical or hydraulic powered operation may be difficult, however, since the powered driver may be required to extend substantially the same length as the telescoping assembly itself. In mobile vehicles or other applications having limited space, insufficient room is available to accommodate lengthy powered drivers.

According to the present invention, a telescoping platform assembly comprises a plurality of slide members including interconnected first, second, third, fourth, and fifth slide members. It further includes means for extending the slide members so that movement of the second slide member over a predetermined distance relative to the first slide member results in movement of the fifth slide member over four times the predetermined distance relative to the first slide member to extend the telescoping platform from a home position to a fully extended position. The telescoping platform assembly further comprises means for retracting the slide members so that movement of the second slide member over a predetermined distance relative to the first slide member results in movement of the fifth slide member over four times the predetermined distance relative to the first slide member to retract the telescoping platform from an extended position to a fully retracted position.

One application for long-reaching telescoping platform assembly in accordance with the present invention is a situation in which it is necessary to move a piece of equipment a fairly long distance on an extension mechanism using a hydraulic cylinder and the available space is so small that only a hydraulic cylinder or other driver having a short stroke can be used. For example, a machine that weighs 1000 pounds has to be supported in a storage position and occasionally moved from its storage position across an aisle in order to engage a second machine. Later, it will be necessary to retract the extension mechanism and the heavy machine to its storage position to clear the aisle. The extension mechanism is space-limited to a maximum of 40 inches when retracted, but must extend a total of 80 inches for the machine to be moved across the aisle to perform its function. A telescoping platform assembly in accordance with the present invention is able to convert each unit of distance moved by the driver into two, four, or greater number of units of rail extension and represents an improvement over conventional telescoping platform assemblies. Such a telescoping platform assembly, would allow the use of a 20 inch driver yet be operable to extend the heavy machine a distance of 80 inches. A 20 inch driver falls well within the space limitations and yet still allows the machine to perform its function.

In preferred embodiments, the means for extending includes a first extension pulley fixed to the second slide member and a first cable attached to the first slide member and the third member and passing over the first pulley. It also includes a second extension pulley which is attached to the third slide member and a second extension cable which is attached to the second slide member and the fourth slide member and passing over the second extension pulley. The means for extending further includes a third extension pulley fixed to the fourth slide member and a third extension cable attached to the third slide member and fifth slide member and passing over the third extension pulley. These pulleys and cables cooperate to extend the effective reach of the telescoping platform assembly without increasing the length of the stroke of the driver used to extend the platform.

The means for retracting the slide members includes a first retraction pulley attached to the second slide member and a first retraction cable fixed to the first slide member and the third slide member and passing over the first retraction pulley. It further includes a second retraction pulley and a second retraction cable which is fixed to the second slide member and the fourth slide member and passes over the second retraction pulley. The means for retracting further includes a third retraction pulley fixed to the fourth slide member and a third retraction cable fixed to the third slide member and the fifth slide member and passing over the third retraction pulley. These retraction pulleys and cables cooperate with the above-noted extension pulleys and cables to make it possible for the same short stroke driver to retract the telescoping platform assembly simply by reversing the driver.

A telescoping platform assembly in accordance with the present invention is capable of multiplying or extending the reach of a driving mechanism. The telescoping platform assembly can thereby extend a platform supporting a heavy machine from a home position to a fully extended position that is far beyond the longest reach available to the driving mechanism. Advantageously, short stroke driving mechanisms can be used to extend telescoping slide assemblies relatively long-distances. This is particularly useful, in applications where a telescoping slide assembly must be capable of having a long reach and space restrictions will only permit use of a short stroke driving mechanism.

Furthermore, the means for retracting the slide members in accordance with the present invention allows a driving mechanism to fully retract the telescoping platform assembly from an extended position which would otherwise be beyond the reach of the driving mechanism to a fully retracted, or home position. By allowing extension of the platform assembly out to four, six, eight, or more times the extension of the driving mechanism, the present invention provides a greater effective reach given the small input and a substantial improvement over conventional extension devices.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying FIGURES in which:

FIG. 3 is a side view of a telescoping platform assembly in accordance with the present invention showing the assembly in a slightly extended position and a pulley and cable extension assembly that is mounted on the slide members and is operable to extend the slide members to a fully extended position in response to forward movement of a reversible drive mechanism;

FIG. 4 is a side view of the opposite side of the telescoping platform assembly illustrated in FIG. 3, showing a pulley and cable retraction assembly that is mounted on the slide members and is operable to retract the slide members from a fully extended position to a fully retracted position in response to rearward movement of the reversible drive mechanism;

FIG. 7 is a side view of the telescoping platform assembly of FIG. 3, illustrating the relative positions of the pulleys of the extension assembly as the drive mechanism is moved forward to extend the telescoping platform assembly further toward its fully extended position;

FIG. 8 is a side view of the telescoping platform assembly of FIG. 3 in a fully extended position.

DETAILED DESCRIPTION OF THE DRAWINGS

A telescoping platform assembly 10 is shown generally in FIGS. 1, 3-4, and 7-8. The assembly 10 is suitable for supporting heavy machinery or apparatus (not shown), either by direct attachment of the machinery to the assembly 10 or by positioning of the machinery upon a platform 102 capable of resting atop casters 28 on the telescoping platform assembly 10. The assembly 10 can be moved between a retracted position (FIGS. 3 and 4 illustrate the assembly 10 in an almost fully retracted position) and a fully extended position as shown illustratively in FIG. 8.

The telescoping platform assembly 10 can be used alone or, more typically, can be used in conjunction with a plurality of other identical assemblies to extend platforms or machinery out beyond the extension capability of the conventional drive mechanism thereby providing a substantial improvement over conventional telescoping slide assemblies. Likewise, the plurality of assemblies can retract platforms or machinery from an extended position beyond the reach 104 of a conventional drive mechanism. The assembly 10 can be sized as necessary, with small assemblies extending less than a meter, to larger assemblies extending ten or more meters.

Figure 2:
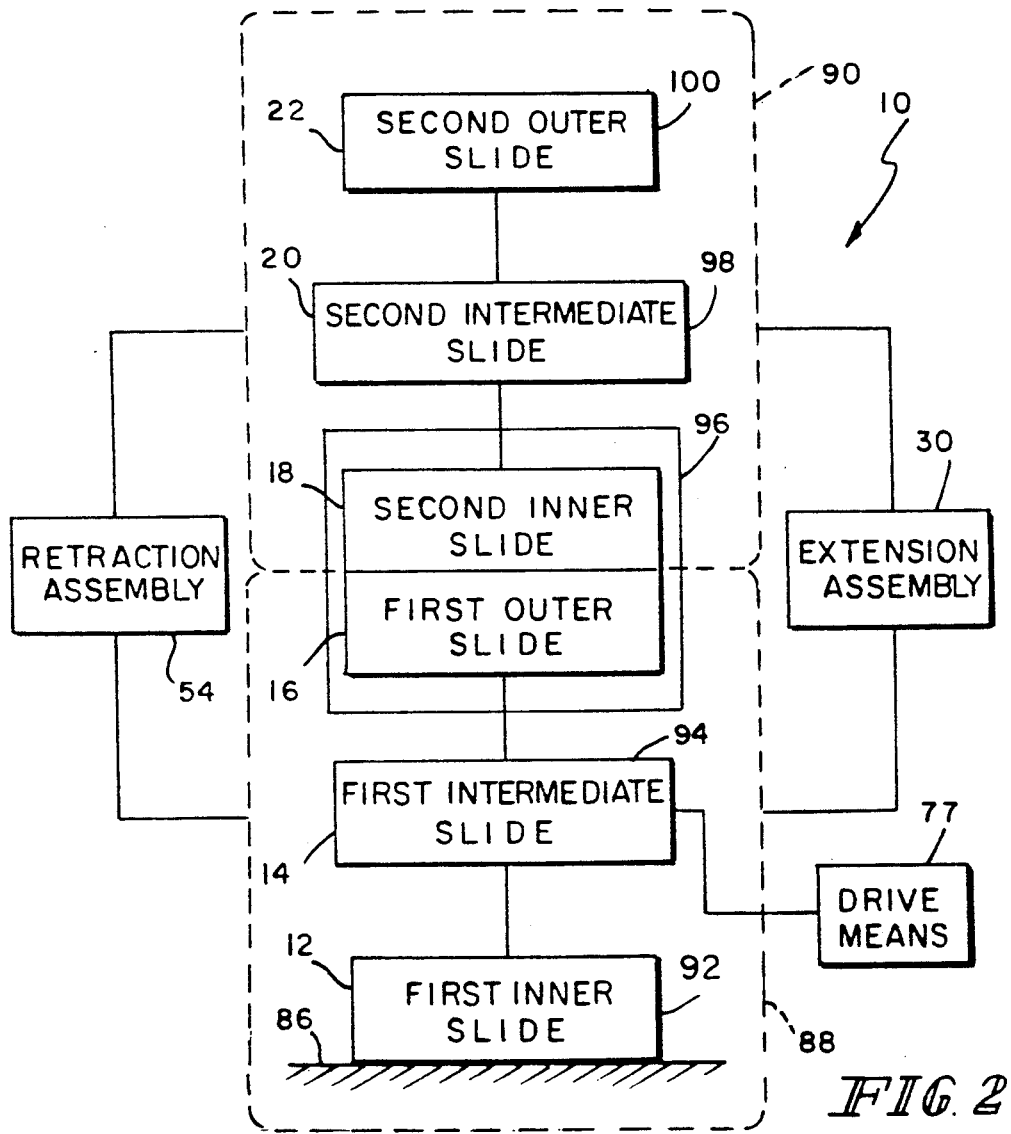
FIG. 2 is a schematic view of one of the telescoping platform assemblies of FIG. 1 diagrammatically showing a bottom telescoping slide assembly with its three slides and a top telescoping slide assembly with its three slides, a drive means, an extension assembly, and a retraction assembly.

As shown schematically in FIG. 2, the telescoping platform assembly 10 is attached to surface 86 which could be a floor or a mobile platform. The telescoping platform assembly 10 includes a first telescoping slide assembly 88 and a second telescoping slide assembly 90. The first slide assembly 88 includes a first inner slide member 12, a first intermediate slide member 14, and a first outer slide member 16. The second slide assembly 90 includes a second inner slide member 18, a second intermediate slide member 20, and a second outer slide member 22. The telescoping platform assembly 10 is formed when the first and second telescoping slide assemblies 88, 90 are attached to each other as, for example, when the first outer slide member 16 is rigidly attached to the second inner slide member 18 as shown diagrammatically in FIG. 2 and in greater detail in FIGS. 5 and 6. The telescoping platform assembly 10 then effectively comprises five slide members 92, 94, 96, 98 and 100 corresponding, respectively, to the first inner slide member 12, the first intermediate slide member 14, the attached first outer and second inner slide members 18 and 20, the second intermediate slide member 20, and the second outer slide member 22.

The drive means 77 is typically a powered driver, such as a hydraulic cylinder, attached to one end of a drive shaft 78 and affixed to the surface 86. The powered driver extends or retracts the drive shaft 78, which in turn extends or retracts the first intermediate slide member 14, to which it is attached.

The extension assembly 30 includes a combination of extension pulleys and cables. The extension cables and pulleys are attached to one side of the platform assembly and arranged to cooperate with each other to extend the platform assembly 10 in response to movement of the first intermediate slide member 14 as it is pushed by the drive shaft 78.

The retraction assembly 54 includes a combination of retraction pulleys and cables. The retraction cables and pulleys are attached to the other side of the platform assembly 10 and arranged to cooperate with each other to retract the platform assembly 10 in response to movement of the first intermediate slide member 14 as it is pulled by the drive shaft 78.

During the retraction operation, tension is applied to the retraction cables to pull the interconnected slide members from an extended position to a retracted position. At the same time, the extension cables, on the other side of the platform assembly 10, are slack. During the extension operation, the extension cables are put under tension and pull the interconnected slide members from a retracted position to an extended position. At the same time that tension is applied to the extension cables, the retraction cables are slack.

Figure 1:
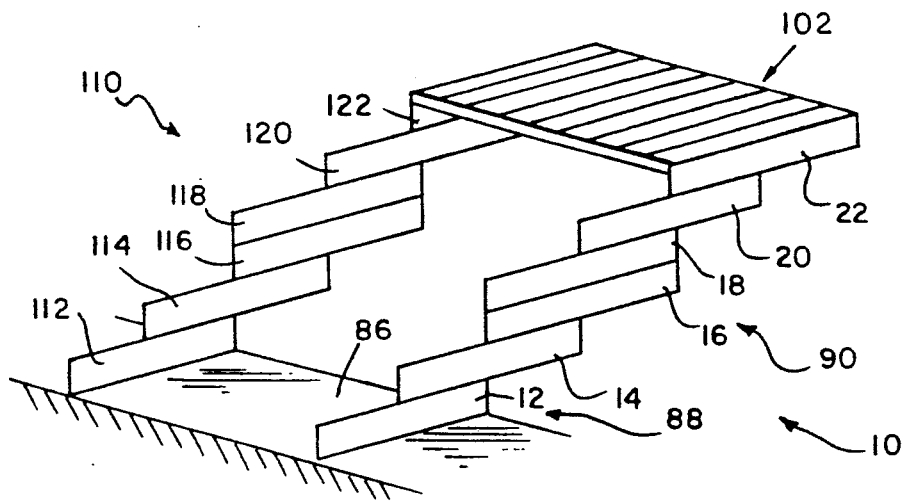
FIG. 1 a perspective view of a pair of stylized telescoping platform assemblies arranged in a spaced-apart parallel relation and in an extended position to support a platform straddling the assemblies.

As shown in FIG. 1, a platform 102 can be extended across two telescoping platform assemblies 10, 110. Alternatively, the platform 102 could be balanced on a single telescoping platform assembly 10. However, in a mobile application, a pair of platform assemblies 10, 110 would be preferable for increased stability.

Figure 5:
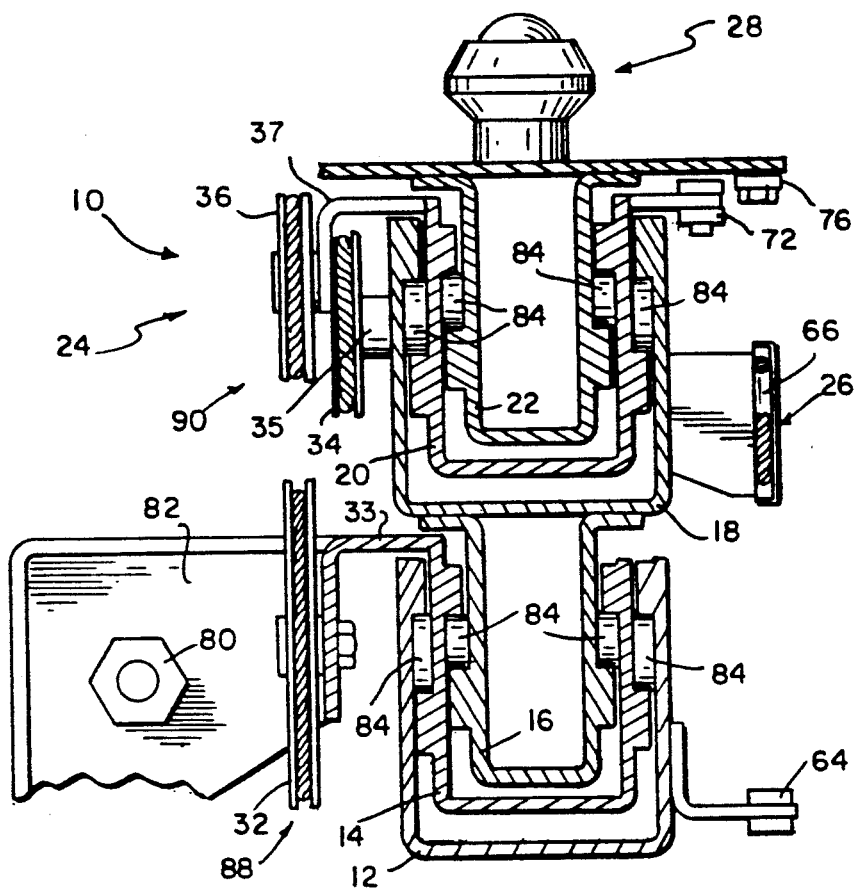
FIG. 5 is a substantially dead sectional view taken along line 5—5 of FIG. 3, with the cables being omitted, illustrating the position of the top telescoping slide assembly as mounted on the bottom telescoping slide assembly, the attachment of the pulleys to the slide members, and modular and nested structure of the telescoping slide members.
Figure 6:
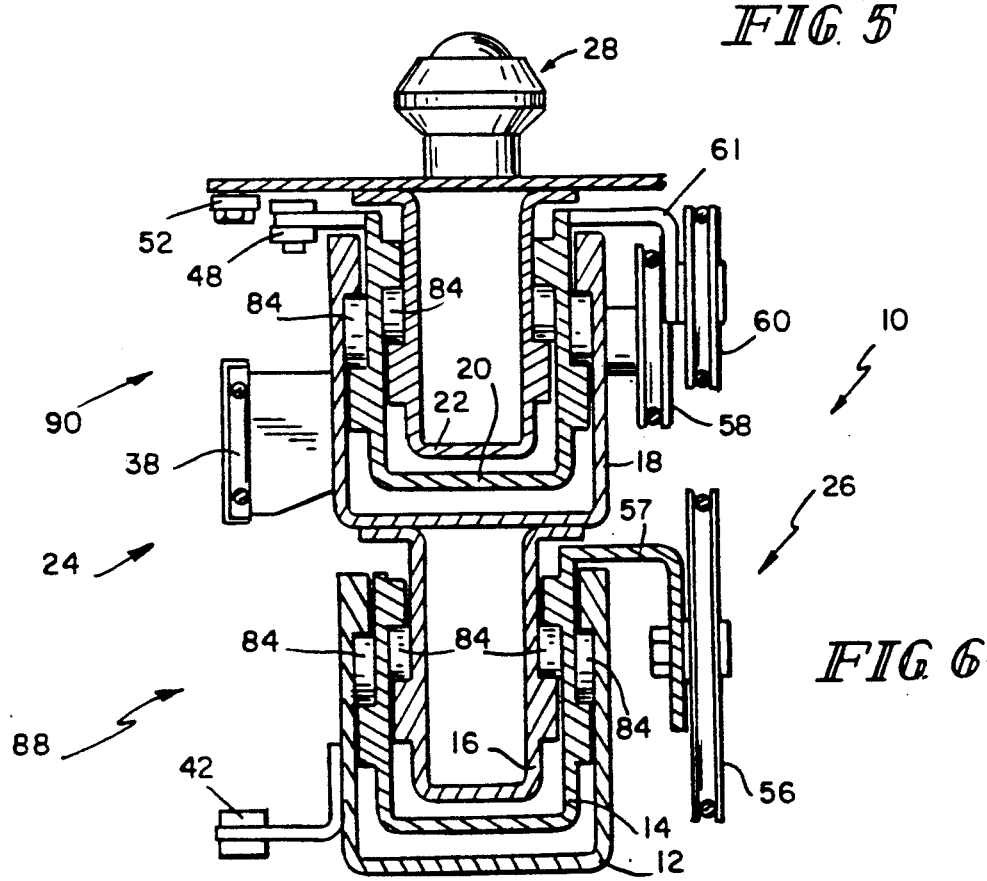
FIG. 6 is a substantially dead sectional view taken along line 6—6 of FIG. 3.
Figure 9:
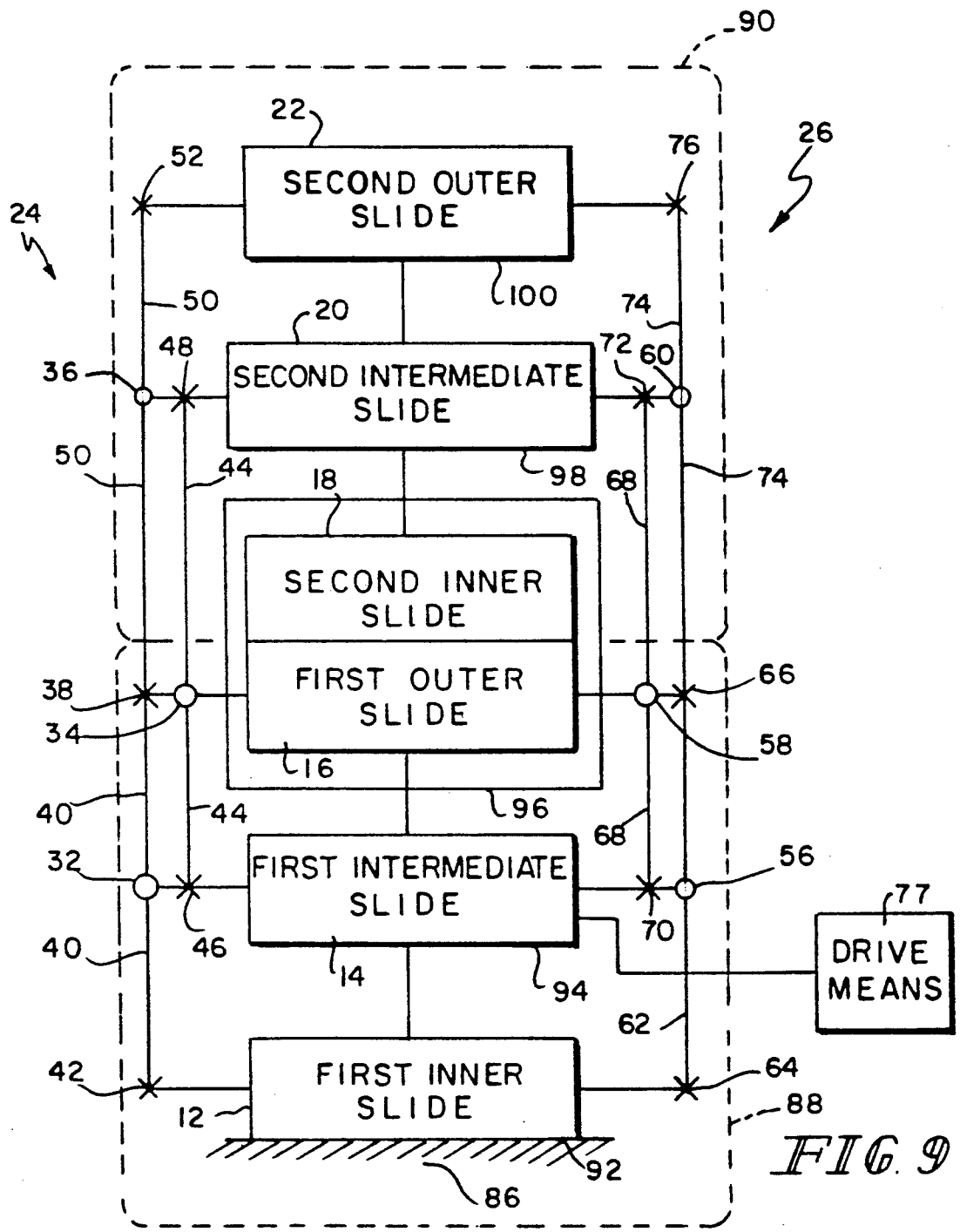
FIG. 9 is a schematic view similar to the view in FIG. 2 diagrammatically illustrating the slide members in the telescoping platform assembly and the extension and retraction assemblies including the pulleys attached to the slide members and the cable interconnections between the slide members and ground the pulleys.

As best illustrated in FIGS. 5 and 6, the telescoping platform assembly 10 includes two telescoping slide assemblies 88, 90, with one slide assembly 90 stacked atop the other slide assembly 88. The first slide assembly 88 includes a first inner slide member 12 which is generally held stationary at a base position relative to the rest of the slide members. The first inner slide member 12 supports a first intermediate slide member 14, which in turn supports a first outer slide member 16. In operation, the first outer slide member 16 extends outwardly from the first inner slide member 12. The second slide assembly 90 includes a second inner slide member 18 supporting a second intermediate slide member 20, which in turn supports a second outer slide member 22. The second inner slide member 18 is attached to the first outer slide member 16 of the first slide assembly, thereby rigidly coupling the first and second slide assemblies 88 and 90, respectively, together.

Each of the slide members 12, 14, 16, 18, 20, 22 are substantially configured to have a U-shaped cross section defined by a pair of side walls interconnected by a bottom wall. A U-shaped channel is defined between the side walls and the bottom wall into which a smaller slide member with a similar U-shaped cross section can be positioned for sliding movement. As illustrated, the first and second inner slide members 12 and 18, respectively, support first and second intermediate slide members 14 and 20, respectively, in their U-shaped channels. These first and second intermediate slide members 14 and 20 themselves respectively support first and second outer slide members 16 and 22 in their U-shaped channels. This arrangement provides a compact, sturdy slide assembly well suited to resist twisting, lateral torque, or other motions tending to separate the slide members. Of course, as those skilled in the art will appreciate, other slide member configurations are also possible, with C-shaped, stacked planar, or other conventional slide member designs being contemplated.

The slide members 14, 16, and 20, 22, are supported for sliding movement on the inner slide members 12, 18 by a plurality of rollers 84. However, ball bearings or other conventional friction reducing elements may also be used.

Movement of the slide members 14, 16, 18, 20, and 22 relative to the first inner slide member 12 is promoted by connection of the first intermediate slide member 14 to a hydraulic, electrical, or mechanical driver 77. As best seen in FIGS. 3 and 4, a driving mechanism 77 includes a drive shaft 78 capable of reciprocating motion attached to a drive shaft mount 82 by a nut 80. The driving mechanism 77 is held stationary relative to the first inner slide member 12 as, for example, when the driving mechanism 77 and the first inner slide member 12 are both rigidly attached to the same table or platform 86. The drive shaft mount 82 is attached to the first intermediate slide member 14. Preferably, for heavy duty applications, a hydraulic-based system is used as a driving mechanism 77 to power the drive shaft 78. However, other conventional power systems including electric motors, or even a manually powered gear system can be used.

An extension assembly 30 attached to an extensor side 24 of the telescoping platform assembly 10 is used to promote extension of telescoping platform assembly 10 in response to forward movement (to the right as seen in FIG. 3) of the first intermediate slide member 14. The extension assembly 30 includes first, second, and third extension pulleys 32, 34, and 36 respectively mounted for rotating movement upon pulley mounts 33, 35, and 37, respectively. The pulley mount 33 holding the first extension pulley 32 is attached to the first intermediate slide member 14. The pulley mount 35 holding the second extension pulley 34 is attached to the second inner slide member 18 (which is rigidly attached to the first outer slide member 16). The pulley mount 37 holding the third extension pulley 36 is attached to the second intermediate slide member 20. In addition to these rotatable pulleys, a fixed extension post 38 is fixedly attached to the second inner slide member 18.

Cables are used to interconnect the pulleys and the slide members so that movement of the first intermediate slide member 14 by the drive mechanism 77 operates to extend or retract the telescoping platform assembly 10 between its retracted and extended positions. A first extension cable 40 is attached by fastener 42 to the first inner slide member 12. The cable 40 passes around and engages the first extension pulley 32 and terminates at the fixed extension post 38 mounted on the first outer slide member 16. A second extension cable 48 is attached by fastener 46 to the first intermediate slide member 14. Cable 48 passes around and engages the second extension pulley 34 and terminates at fastener 48 attached to the second intermediate slide member 20. A third extension cable 50 is attached to the second inner slide member 20 at the fixed extension post 38. Cable 50 passes around and engages the third extension pulley 36 and terminates at fastener 52 attached to the second outer slide member 22.

As illustrated in FIG. 4, a retraction assembly 54 is mounted on a retractor side 26 of the telescoping platform assembly 10. The retractor assembly 54 is similar to the extension assembly 30, but is configured to operate in a reverse direction so that the telescoping platform assembly 10 can be moved from its extended position to its retracted position. In response to a backward movement 79 of the first intermediate slide member 14, the retraction assembly 54 acts to retract the slide members from an extended position such as shown in FIG. 6 to a retracted position such as shown in FIGS. 3 and 4. The retraction assembly 54 includes first, second, and third retraction pulleys 56, 58, and 60, respectively, mounted for rotating movement upon pulley mounts 57, 59, and 61, respectively. The pulley mount 57 holding the first retraction pulley 56 is attached to the first intermediate slide member 14. The pulley mount 59 holding the second retraction pulley 58 is attached to the second inner slide member 18. The pulley mount 61 holding the third retraction pulley 60 is attached to the second intermediate slide member 20. In addition to these rotatable pulleys, a fixed retraction post 66 is fixedly attached to the second inner slide member 18.

Cables are used to interconnect the pulleys and the slide members 66. A first retraction cable 62 is attached by fastener 64 to the first inner slide member 12. Cable 62 passes around and engages first retraction pulley 56 and terminates at the fixed retraction post 66 attached to the second inner slide member 18. A second retraction cable 68 is attached by fastener 70 to the first intermediate slide member 14. Cable 68 passes around and engages the second retraction pulley 58 and terminates at fastener 72 attached to the second intermediate rail 20. A third retraction cable 74 is attached to the fixed retraction post 66. Cable 74 passes around and engages the third retraction pulley 60 and is attached by fastener 76 to the second outer slide member 22.

In an extending operation, a drive mechanism 77 moves the drive shaft 78 and the attached first intermediate slide member 14 to the right as seen in FIG. 7. The extension cables 40, 48, and 50 are adjusted so that movement of the intermediate slide member 14 puts tension on extension cables 40, 48, and 50. Advantageously, during extension, the retraction cables 62, 68, and 74 are not under tension, thereby reducing wear on the retraction cables, pulleys, and pulley mounts. The drive shaft 78 moves the first intermediate slide member 14 a unit measure 108 of movement relative to the first inner slide member 12, as shown illustratively in FIG. 7. The first extension pulley 32 travels the unit measure 108 of movement with the first intermediate slide member 14, pulling the first extension cable 40 the unit measure 108 of movement relative to the first inner slide member 12. However, the first extension cable 40 is rigidly attached at fastener 42 to the first inner slide member 12, which in turn is affixed to the platform or table 86. Therefore, only the end of the first extension cable 40 which is rigidly attached to the fixed extension post 38 can move in response to the movement of pulley 32. By rigid attachment to the first extension cable 40, the second inner slide member 18 is pulled by the first extension cable 40 so as to extend two unit measures 108 of movement in the direction of movement of the drive shaft 78.

The second extension pulley 34, being attached to the second inner slide member 18, is therefore moved two unit measures 108 of movement relative to the first inner slide member 12. The second extension cable 44, which passes over the second extension pulley 34, is attached to the first intermediate slide member 14 by the fastener 46. However, the first intermediate slide member 14 has only moved one unit measure 108 of movement relative to the first inner slide member 12. Therefore, there is a net relative movement of one unit measure 108 of movement between the second extension pulley 34 and the first intermediate slide member 14, tending to pull the second extension cable 44 the unit measure 108 of relative movement. Again, only the end of the second extension cable 44 which is attached to the second intermediate slide member 20 at fastener 48 is able to move in response to the movement of pulley 34. As a result, the second intermediate slide member 20 is pulled twice the relative distance or two unit measures 108 of movement relative to the first intermediate slide member 14 in the direction of movement of the drive shaft 78. Since the first intermediate slide member 14 has been extended one unit measure 108 of movement, the second intermediate slide member 20 has been pulled so as to extend three unit measures 108 of movement relative to the first inner slide member 12 in the direction of movement of the drive shaft 78.

The third extension pulley 36, being rigidly attached to the second intermediate slide member 20, moves three unit measures 108 of movement relative to the first inner slide member 12. However, the second inner slide member 18 has only moved two unit measures 108 of movement, resulting in one unit measure 108 of relative movement between the third extension pulley 36 and the second inner slide member 18. The third extension cable 50 passes around the third extension pulley 36 and is attached by the fixed extension post 38 to the second inner slide member 18. Therefore, only the end of the third extension cable 50 which is attached to the second outer slide member 22 by fastener 52 is able to move in response to the movement of the third extension pulley 36. As a result, the second outer slide member 22 moves twice the relative distance travelled or two unit measures 108 of movement relative to the second inner slide member 18. Since the second inner slide member 18 has extended two unit measures 108 of movement relative to the first inner slide member 12, the second outer slide member 22 extends a total of four unit measures 108 of movement relative to the first inner slide member 12. Advantageously, in response to a single unit measure 108 of movement extending the first intermediate slide member 14 relative to the first inner slide member 12, the second outer slide member 22 extends four unit measures 108 of movement relative to the first inner slide member 12. In the case of the situation in which it is necessary to move a piece of equipment a total of 80 inches across an aisle on an extension mechanism that is space limited to 40 inches, a 20 inch driver would extend the machine the required 80 inches to engage the second machine.

It will be appreciated that a third telescoping slide assembly can be attached to the second telescoping slide assembly of the present embodiment, thereby extending a third outer slide member six unit measures 108 of movement relative to the first inner slide member 12. In like manner, a fourth telescoping slide assembly could be added to provide for eight unit measures 108 of movement and so on.

Retraction is the reverse of the extension process. During retraction, the drive shaft 78 is retracted from an extended position by the driving mechanism 77. As the drive shaft 78 is retracted, it pulls the first intermediate slide member 14 to the right as seen in FIG. 4. The retraction cables 62, 68 and 74 are adjusted so that movement of the first intermediate slide member 14 puts tension on the retraction cables 62, 68, and 74. Working in a fashion analogous to the extension assembly 30, the retractor assembly 54 pulls the slide members 12, 14, 16, 18, 20 and 22 from an extended position toward a retracted, or home position. Advantageously, during retraction, the extension cables 40, 48, and 50 are not under tension, thereby reducing wear on the extension cables, pulleys, and pulley mounts.

During the retraction process, the drive mechanism moves the drive shaft 78 and the attached first intermediate slide member 14 to the left, as viewed in FIG. 3. Illustratively, the drive shaft 78 moves the first intermediate slide member 14 a unit measure 108 of movement relative to the first inner slide member 12. The first retraction pulley 56 and first retraction cable 62 travel the unit measure 108 of movement with the first intermediate slide member 14. Operating in a fashion analogous to the first extension pulley 32 and first extension cable 40, one end of the first retraction cable 62 is rigidly fixed to the first inner slide member 12. The second inner slide member 18 is pulled by the other end of the first retraction cable 62 so as to retract two unit measures 108 of movement in the direction of movement of the drive shaft 78.

The second retraction pulley 68, being attached to the second inner slide member 18, moves two unit measures 108 of movement relative to the first inner slide member 12 and pulls the second retraction cable 68 with it. Operating in a fashion analogous to the second extension pulley 34 and second extension cable 48, one end of the second retraction cable 68 is rigidly fixed to the first intermediate slide member 14. The other end of the second retraction cable 68 pulls the second intermediate slide member 20 so as to retract the second intermediate slide member 20 three unit measures 108 of movement relative to the first inner slide member 12 in the direction of movement of the drive shaft 78.

The third retraction pulley 60, being attached to the second intermediate slide member 20, moves three unit measures 108 of movement relative to the first inner slide member 12, pulling the third retraction cable 74 with it. Operating in a fashion analogous to the third extension pulley 36 and third extension cable 50, one end of the third retraction cable 74 is rigidly attached to the second inner slide member 18. The other end of the third retraction cable 74 retracts the second outer slide member 22 four unit measures 108 of movement relative to the first inner slide member 12. Advantageously, in response to a single unit measure 108 of movement retracting the first intermediate slide member 14 relative to the first inner slide member 12, the second outer slide member 22 retracts four unit measures 108 of movement relative to the first inner slide member 12 in the direction of movement of the drive shaft 78.

From the foregoing, it will be appreciated that the telescoping platform assembly 10 effectively multiplies the reach 104 of a given drive mechanism 77 without changing the stroke of the drive mechanism. The telescoping platform assembly 10 extends a platform 10 out to a fully extended distance 106 that is four times the total reach 104 of the drive shaft 78. This multiplication of total reach 104 is especially advantageous in mobile operations where space is limited and the size of the drive mechanism 77 and corresponding drive shaft 78 is restricted. For instance, in the situation in which it is necessary to move a piece of equipment a total of 80 inches across an aisle on an extension mechanism that is space limited to 40 inches, a 20 inch driver is adequate to retract the first machine the required 80 inches in order to clear the aisle.

Although the invention has been described in detail with reference to certain preferred embodiments, variations and modifications exist within the scope and spirit of the invention as described and defined in the following claims.

I claim:

1. A telescoping platform assembly comprising
   a telescoping slide assembly including interconnected first, second, third, fourth, and fifth slide members, the slide members being movable relative to one another to expand the telescoping slide assembly between a home position and a fully projected position,
   first means for coupling the first, second, and third slide members together so that movement of the second slide member over a predetermined distance relative to the first slide member causes the third slide member to move twice the predetermined distance relative to the first slide member to extend the third slide member from a retracted position to an extended position and expand the telescoping slide assembly toward its fully projected position,
   second means for coupling the second, third, and fourth slide members together so that movement of the third slide member over the twice the predetermined distance relative to the first slide member results in the fourth slide member moving three times the predetermined distance relative to the first slide member to extend the fourth slide member from a retracted position to an extended position and expand the telescoping slide assembly further toward its fully projected position, and
   third means for coupling the third, fourth, and fifth slide members together so that movement of the third slide member over the twice the predetermined distance relative to the first slide member results in the fifth slide member moving four times the predetermined distance relative to the first slide member to extend the fifth slide member from a retracted position to an extended position and expand the telescoping slide assembly to reach its fully projected position.

2. The telescoping platform assembly of claim 1, wherein the first means for coupling includes a first pulley fixed to the second slide member and a first cable attached to each of the first slide member and the third slide member and passing over the first pulley.

3. The telescoping platform assembly of claim 2, further comprising first and second telescoping slide assemblies wherein the first telescoping slide assembly includes a first inner slide member and a first intermediate slide member and a first outer slide member, the second telescoping slide assembly includes a second inner slide member and a second intermediate slide member and a second outer slide member, and the second inner slide member is rigidly attached to the first outer slide member to form the third slide member.

4. The telescoping platform assembly of claim 1, wherein the second means for coupling includes a second pulley fixed to the third slide member and a second cable attached to each of the second slide member and the fourth slide member and passing over the second pulley.

5. The telescoping platform assembly of claim 4, further comprising first and second telescoping slide assemblies wherein the first telescoping slide assembly includes a first inner slide member and a first intermediate slide member and a first outer slide member, the second telescoping slide assembly includes a second inner slide member and a second intermediate slide member and a second outer slide member, and the second inner slide member is rigidly attached to the first outer slide member to form the third slide member.

6. The telescoping platform assembly of claim 1, wherein the third means for coupling includes a third pulley fixed to the fourth slide member and a third cable attached to each of the third slide member and the fifth slide member and passing over the third pulley.

7. The telescoping platform assembly of claim 6, further comprising first and second telescoping slide assemblies wherein the first telescoping slide assembly includes a first inner slide member and a first intermediate slide member and a first outer slide member, the second telescoping slide assembly includes a second inner slide member and a second intermediate slide member and a second outer slide member, and the second inner slide member is rigidly attached to the first outer slide member to form the third slide member.

8. The telescoping platform assembly of claim 1, further comprising fourth means for coupling the first, second, and third slide members together so that movement of the second slide member over a predetermined distance relative to the first slide member results in the third slide member moving twice the predetermined distance relative to the first slide member to retract the telescoping slide members from an extended position towards its fully retracted position, fifth means for coupling the second, third, and fourth slide members together so that movement of the third slide member over the twice the predetermined distance relative to the first slide member results in the fourth slide member moving three times the predetermined distance relative to the first slide member to retract the telescoping slide members from an extended position further towards its full retracted position, and sixth means for coupling the third, fourth, and fifth slide members together so that movement of the third slide member over the twice the predetermined distance relative to the first slide member results in the fifth slide member moving four times the predetermined distance relative to the first slide member to retract the telescoping slide members from an extended position to reach its fully retracted position.

9. The telescoping platform assembly of claim 8, wherein the fourth means for coupling includes a fourth pulley fixed to the second slide member and a fourth cable attached to each of the first slide member and the third slide member and passing over the fourth pulley.

10. The telescoping platform assembly of claim 9, further comprising first and second telescoping slide assemblies wherein the first telescoping slide assembly includes a first inner slide member and a first intermediate slide member and a first outer slide member, the second telescoping slide assembly includes a second inner slide member and a second intermediate slide member and a second outer slide member, and the second inner slide member is rigidly attached to the first outer slide member to form the third slide member.

11. The telescoping platform assembly of claim 8, wherein the fifth means for coupling includes a fifth pulley fixed to the third slide member and a fifth cable attached to each of the second slide member and the fourth slide member and passing over the fifth pulley.

12. The telescoping platform assembly of claim 11, further comprising first and second telescoping slide assemblies wherein the first telescoping slide assembly includes a first inner slide member and a first intermediate slide member and a first outer slide member, the second telescoping slide assembly includes a second inner slide member and a second intermediate slide member and a second outer slide member, and the second inner slide member is rigidly attached to the first outer slide member to form the third slide member.

13. The telescoping platform assembly of claim 8, wherein the sixth means for coupling includes a sixth pulley fixed to the fourth slide member and a sixth cable attached to each of the third slide member and the fifth slide member and passing over the sixth pulley.

14. The telescoping platform assembly of claim 13, further comprising first and second telescoping slide assemblies wherein the first telescoping slide assembly includes a first inner slide member and a first intermediate slide member and a first outer slide member, the second telescoping slide assembly includes a second inner slide member and a second intermediate slide member and a second outer slide member, and the second inner slide member is rigidly attached to the first outer slide member to form the third slide member.

15. A telescoping platform assembly comprising
a plurality of telescoping slide members including interconnected first, second, third, fourth, and fifth slide members,
means for extending the slide members so that movement of the second slide member over a predetermined distance relative to the first slide member results in movement of the fifth slide member over four times the predetermined distance relative to the first slide member to extend the telescoping platform from a home position to a fully extended position, and
means for retracting the slide members so that movement of the second slide member over a predetermined distance relative to the first slide member results in movement of the fifth slide member over four times the predetermined distance relative to the first slide member to retract the telescoping platform from an extended position to a fully retracted home position.

16. The telescoping platform assembly of claim 15, wherein the means for extending further comprises first means for coupling the first, second, and third slide members together so that movement of the second slide member over a predetermined distance relative to the first slide member results in the third slide member moving twice the predetermined distance relative to the first slide member, second means for coupling the second, third, and fourth slide members together so that the movement of the third slide member over the twice the predetermined distance relative to the first slide member results in the fourth slide member moving three times the predetermined distance relative to the first slide member, and third means for coupling the third, fourth, and fifth slide members together so that the movement of the third slide member over the twice the predetermined distance relative to the first slide member results in the fifth slide member moving four times the predetermined distance relative to the first slide member.

17. The telescoping platform assembly of claim 16, wherein the first means for coupling includes a first pulley fixed to the second slide member and a first cable attached to each of the first slide member and the third slide member and passing over the first pulley.

18. The telescoping platform assembly of claim 16, wherein the second means for coupling includes a second pulley fixed to the third slide member and a second cable attached to each of the second slide member and the fourth slide member and passing over the second pulley.

19. The telescoping platform assembly of claim 16, wherein the third means for coupling includes a third pulley fixed to the fourth slide member and a third cable attached to each of the third slide member and the fifth slide member and passing over the third pulley.

20. The telescoping platform assembly of claim 15, wherein the means for retracting further comprises fourth means for coupling the first, second, and third slide members together so that movement of the second slide member over a predetermined distance relative to the first slide member causes the third slide member to move twice the predetermined distance relative to the first slide member, fifth means for coupling the second, third, and fourth slide members together so that movement of the second slide member over a predetermined distance relative to the first slide member causes the fourth slide member to move three times the predetermined distance relative to the first slide member, and sixth means for coupling the third, fourth, and fifth slide members together so that movement of the second slide member over a predetermined distance relative to the first slide member causes the fifth slide member to move four times the predetermined distance relative to the first slide member.

21. The telescoping platform assembly of claim 20, wherein the fourth means for coupling includes a fourth pulley fixed to the second slide member and a fourth cable attached to each of the first slide member and the third slide member and passing over the fourth pulley.

22. The telescoping platform assembly of claim 20, wherein the fifth means for coupling includes a fifth pulley fixed to the third slide member and a fifth cable attached to each of the second slide member and the fourth slide member and passing over the fifth pulley.

23. The telescoping platform assembly of claim 20, wherein the sixth means for coupling includes a sixth pulley fixed to the fourth slide member and a sixth cable attached to each of the third slide member and the fifth slide member and passing over the sixth pulley.

24. A telescoping platform assembly comprising
a first telescoping slide assembly having a first slide member, a second slide member slidably coupled to the first slide member, and a first connecting slide member slidably coupled to the second slide member,
a second telescoping slide assembly attached to the first slide assembly, the second slide assembly having a second connecting slide member rigidly attached to the first connecting slide member to define a third slide member, a fourth slide member slidably coupled to the second connecting slide member and a fifth slide member slidably coupled to the fourth slide member,
means for extending the first and second slide assemblies from a home position to an extended position, and
means for retracting to the first and second slide assemblies from an extended position to a home position.

25. The assembly of claim 24, wherein the means for extending further comprises a first pulley fixed to the second slide member and a first cable attached to each of the first slide member and the third slide member and passing over the first pulley, a second pulley fixed to the third slide member and a second cable attached to each of the second slide member and the fourth slide member and passing over the second pulley, and a third pulley fixed to the fourth slide member and a third cable attached to each of the third slide member and the fifth slide member and passing over the third pulley.

26. The assembly of claim 24, wherein the means for retracting further comprises a fourth pulley attached to the second slide member and a fourth cable attached to each of the first slide member and the third slide member and passing over the fourth pulley and a fifth pulley attached to the third slide member and a fifth cable attached to each of the second slide member and the fourth slide member and passing over the fifth pulley and a sixth pulley attached to the fourth slide member and a sixth cable attached to each of the third slide member and the fifth slide member and passing over the sixth pulley.

27. A slide member assembly comprising a first slide member,
a second slide member slidably coupled to first slide member,
a first connecting slide member slidably coupled to the a second slide member and a second connecting slide member rigidly attached to the first connecting slide member, the attached first and second connecting slide members defining a third slide member,
a fourth slide member slidably coupled to the third slide member,
a fifth slide member slidably coupled to the fourth slide member,
a first pulley attached to the second slide member and a first cable attached to each of the first slide member and the third slide member and passing over the first pulley,
a second pulley attached to the third slide member and a second cable attached to each of the second slide member and the fourth slide member and passing over the second pulley,
a third pulley attached to the fourth slide member and a third cable attached to each of the third slide member and the fifth slide member and passing over the third pulley,
a fourth pulley attached to the second slide member and a fourth cable attached to each of the first slide member and the third slide member and passing over the fourth pulley,
a fifth pulley attached to the third slide member and a fifth cable attached to each of the second slide member and the fourth slide member and passing over the fifth pulley, and
a sixth pulley attached to the fourth slide member and a sixth cable attached to each of the third slide member and the fifth slide member and passing over the sixth pulley.

28. A system for controlling telescoping of a plurality of interconnected slide members, the system comprising
a first and second telescoping slide assemblies stacked on top of one another, each slide assembly including an inner slide member, an outer slide member, and an intermediate slide member connecting the inner and outer slide members, the inner slide member of the second telescoping slide assembly being rigidly attached to the outer slide member of the first telescoping slide assembly so that the second telescoping slide assembly is mounted on the outer slide member of the first telescoping slide assembly to move therewith,
means for extending the slide members so that movement of the first intermediate slide member over a predetermined distance relative to the first inner slide member results in movement of the second outer slide member over four times the predetermined distance relative to the first inner slide member to extend the telescoping platform from a home position to a fully extended position, and
means for retracting the slide members so that movement of the first intermediate slide member over a predetermined distance relative to the first inner slide member results in movement of the second outer slide member over four times the predetermined distance relative to the first inner slide member to retract the telescoping platform from an extended position to a home position.

29. The system of claim 28, further comprising a first pulley fixed to the first intermediate slide member and a first cable attached to each of the first inner slide member and the first outer slide member and passing over the first pulley and a second pulley fixed to the first outer slide member and a second cable attached to each of the first intermediate slide member and the second intermediate slide member and passing over the second pulley and a third pulley fixed to the second intermediate slide member and a third cable attached to each of the first outer slide member and the second outer slide member and passing over the third pulley and a fourth pulley fixed to the first intermediate slide member and a fourth cable attached to each of the first inner slide member and the first outer slide member and passing over the fourth pulley and a fifth pulley fixed to the first outer slide member and a fifth cable attached to each of the first intermediate slide member and the second intermediate slide member and passing over the fifth pulley and a sixth pulley fixed to the second intermediate slide member and a sixth cable attached to each of the first outer slide member and the second outer slide member and passing over the sixth pulley.

* * * * *